United States Patent [19]

Dorner et al.

[11] Patent Number: 4,861,225

[45] Date of Patent: Aug. 29, 1989

[54] APPARATUS FOR STACKING ARTICLES IN A SIDE-BY-SIDE RELATION

[75] Inventors: Wolfgang C. Dorner; Michael C. Allen, both of Oconomowoc; Mark C. Wedell, Delafield; Michael A. Hosch, Hartland, all of Wis.

[73] Assignee: Dorner Mfg. Corp., Hartland, Wis.

[21] Appl. No.: 34,614

[22] Filed: Apr. 6, 1987

[51] Int. Cl.$^4$ .............................................. B65G 61/00
[52] U.S. Cl. ................................ 414/789.9; 198/431; 198/457; 414/790.3; 414/798.7
[58] Field of Search ................. 198/431, 457; 271/177, 271/180, 181, 215, 220; 414/46, 97, 108, 790.3, 798.7, 789.9

[56] References Cited

U.S. PATENT DOCUMENTS

| | | | |
|---|---|---|---|
| 3,729,895 | 5/1973 | Kramer et al. | 414/46 X |
| 4,474,366 | 10/1984 | Reider | 271/220 X |
| 4,512,263 | 4/1985 | Lanning | 271/181 X |
| 4,539,795 | 9/1985 | Wilkinson | 414/46 X |

Primary Examiner—Robert J. Spar
Assistant Examiner—Janice Krizek
Attorney, Agent, or Firm—Andrus, Sceales, Starke & Sawall

[57] ABSTRACT

An apparatus for stacking a plurality of articles in a side-to-side relation. The articles are conveyed in an upright end-to-end relation on a conveyor and a bin or article receiving member is positioned adjacent the downstream end of the conveyor and individually receives each article discharged from the conveyor. The bin includes a bottom wall and a rear wall and the bin is movable between a receiving position where the bottom wall extends downwardly and outwardly from the downstream end of the conveyor, to a discharge position where the bottom wall is disposed substantially horizontal. Each article being received within the bin is held in an upright position and is transferred laterally within the bin against a movable support plate, and each succeeding article received in the bin is transferred in a similar manner against the preceding article to form a stack. The bin is then tilted so that the bottom surface is generally horizontal and a pusher plate pushes the stack of articles forwardly out of the bin onto a discharge conveyor.

17 Claims, 3 Drawing Sheets

APPARATUS FOR STACKING ARTICLES IN A SIDE-BY-SIDE RELATION

BACKGROUND OF THE INVENTION

In a programmed conveyor system for conveying small articles or parts, the articles are moved sequentially through a series of workstations or operations. For example, in the fabrication of small plastic cases to contain compact recording discs, coin collections, or the like it is desired to have a programmed system in which the molded casing halves or sections are hinged together, folded to a closed condition and then stacked in side-by-side relation and fed as a stack into a container or box.

SUMMARY OF THE INVENTION

The invention s directed to a method and apparatus for stacking a plurality of small articles, such as hinged plastic cases, in side-by-side relation. In accordance with the invention, the articles are conveyed edgewise in end-to-end relation on a conveyor and an article receiving means or bin is located adjacent the discharge or downstream end of the conveyor so that each article is sequentially transferred from the conveyor to the bin.

The bin includes a bottom wall and a rear wall and the bin is movable between a receiving position where the bottom wall extends downwardly and away from the discharge end of the conveyor, to a discharge position where the bottom wall is disposed generally horizontally.

As each article is transferred to the bin, it is held in an upright condition by a cam operated holding member. The article is then transferred laterally by a pusher into engagement with a support plate that is mounted for transverse movement relative to the bin. The article is held in an upright condition against a support plate by a second cam operated latch.

As each article is sequentially delivered to the bin it is moved laterally against the support plate to form a side-by-side stack of the articles.

When the desired number of articles have been stacked, the bin is tilted to bring the bottom wall to a generally horizontal attitude and the stack is then pushed from the bin by a pusher mechanism onto a discharge conveyor.

The apparatus of the invention enables small articles to be automatically stacked in a side-by-side relation and delivered as a stack to a discharge mechanism for feeding to a box or container.

As a feature of the invention the rear wall of the bin is provided with an ejection slot which is normally closed by a sliding gate. If a malfunction occurs in the conveying system, the gate is moved to a non-obstructing position so that each article being delivered to the bin will pass directly through the ejection slot and not be stacked.

The apparatus of the invention is useable for stacking a wide variety of articles and has particular use for stacking vertically elongated articles which would normally tend to tilt and fall when being conveyed.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
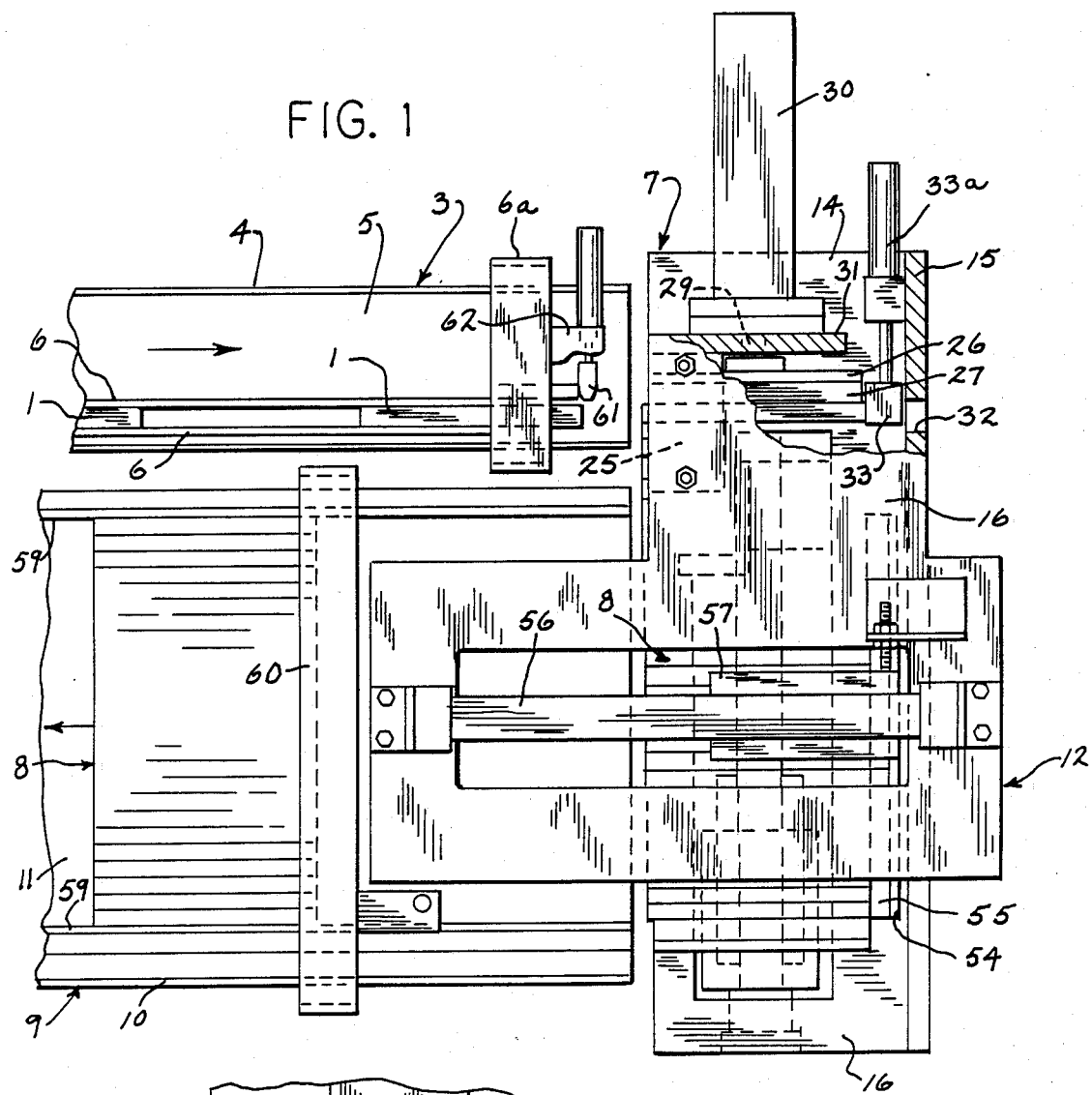
FIG. 1 is a top plan view of the apparatus of the invention.
Figure 6:
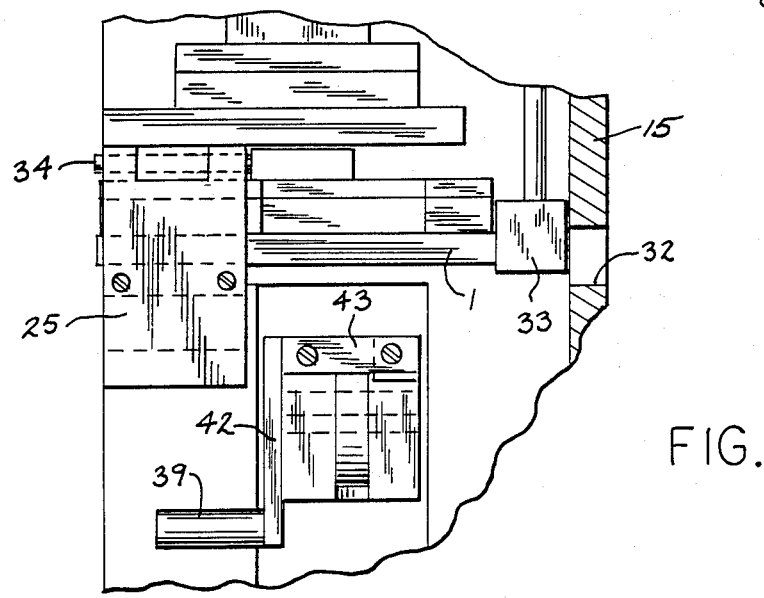
FIG. 6 is an enlarged fragmentary top plan view with parts broken away showing the holding member and latch.
Figure 2:
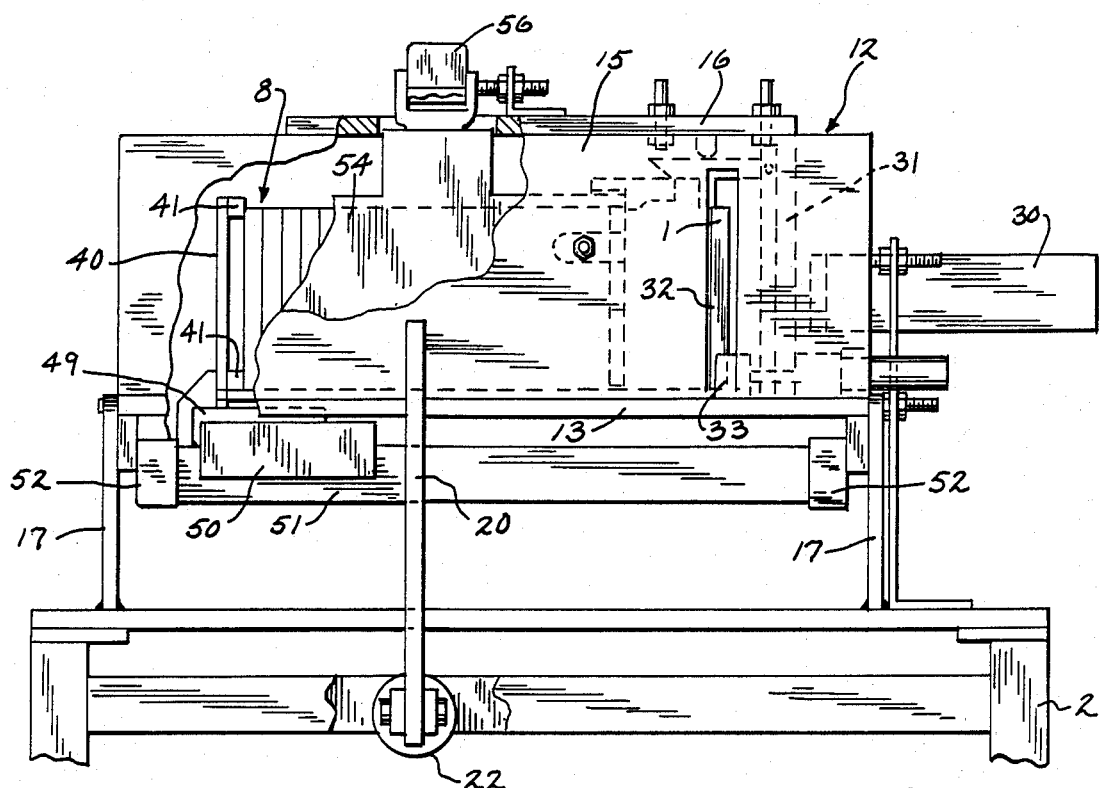
FIG. 2 is a rear view of the apparatus shown in FIG. 1.
Figure 3:
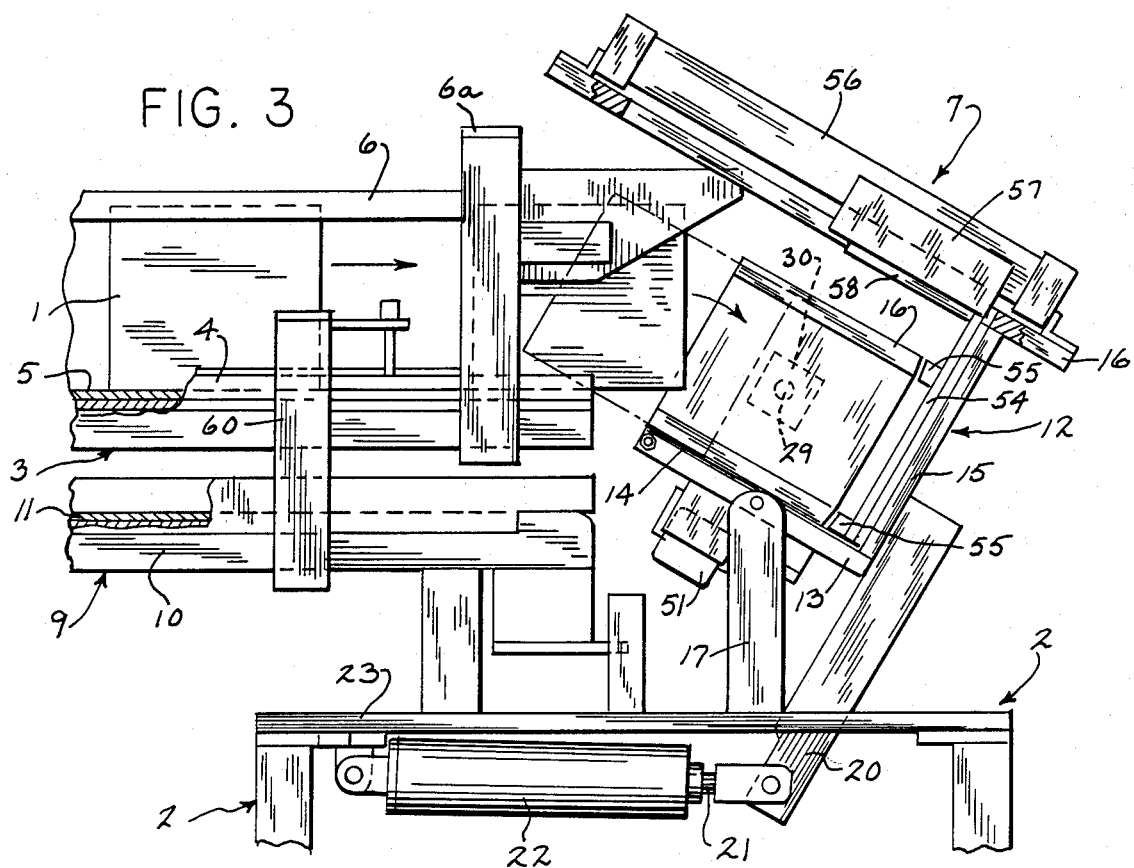
FIG. 3 is a side elevation of the apparatus with parts broken way.

The drawings illustrate an apparatus for stacking a group of relatively thin articles 1 in sideby-side relation. As shown in the drawings, the articles are hinged plastic cases adapted to hold compact discs.

The apparatus comprises a frame or supporting structure 2 and a conveyor 3 is mounted on frame 2. Conveyor 3 comprises a frame 4 and a belt 5 is mounted for endless travel on frame 4. As shown in FIG. 1, articles 1 are conveyed edgewise in an end-to-end relation, and as the articles are relatively thin, a pair of guide rails 6 are mounted in spaced relation above belt 5 and serve to guide the articles 1 in movement. Guides 6 are supported by arches 6a which extend over conveyor 3.

Articles 1 are individually fed to a stacking unit 7 where the articles 1 are stacked in a side-byside relation to form a stack 8. The stack 8 is subsequently discharged onto a second conveyor 9 which is disposed parallel to conveyor 3 and located at a lower level than conveyor 3. As in the case of conveyor 3, conveyor 9 includes a supporting frame 10 and a belt 11 which is mounted for endless travel on frame 10.

Conveyors 3 and 9 are driven in a conventional manner by a drive mechanism not shown.

Stacking unit 7 includes an article receiving means or bin 12 in which articles 1 are individually received. Bin 12 includes a bottom wall 13 which is covered by a stainless steel surface plate 14 and a rear wall 15 extends upwardly from the rear edge of bottom wall 13. In addition, a top wall 16 extends outwardly from the upper edge of rear wall 15.

Bin 12 is mounted for pivoting movement so that the bin is movable between a receiving position where bottom wall 13 extends downwardly and away from the downstream end of conveyor 3, to a discharge position where bottom wall 13 is generally horizontal. To provide the tilting action, a pair of arms 17 extend upwardly from frame 2 and pivotally connects the bin at the side edges of plate 13, approximately midway between the front and rear ends of the plate.

To tilt the bin 12, an arm 20 is secured to rear wall 15 and the lower end of arm 20 is pivotally connected to the outer end of a piston rod 21 which is mounted for sliding movement within fluid cylinder 22 that is carried by frame 2. The rear end of cylinder 22 is pivotally connected to lugs which extend downwardly from plate 23 of frame 2.

By introducing a fluid, such as air, into one end of cylinder 22, piston rod 21 will be retracted to tilt bin 12 to the inclined receiving position and by extending piston rod 21 the bin will be moved to the generally horizontal discharge position.

The location of the connection of arms 17 with bin 12 insures that if cylinder 22 should lose pressure, the bin will remain in a tilted position due to the weight distribution and will not fall by gravity to the horizontal position.

As each article 1 is received in bin 12 it is held in an upright condition between a transfer unit 24 and a holding member 25 which is engaged with the upper edge of article 1.

Transfer unit 24 includes a transfer plate 26 having upper and lower protective strips 27 and 28 made of nylon or the like. A piston rod 29 of fluid cylinder 30 is connected to transfer plate 26. Cylinder 30 is mounted to side plate 31 of bin 12. By extending piston rod 29 the article 1 can be transferred laterally across the bottom wall 13 of bin 12, as will hereinafter be described.

Rear wall 15 is provided with an ejection slot 32 which is located in alignment with the path of travel of articles 1 as they are delivered to bin 12. Slot 32 is normally closed or obstructed by a gate or abutment 33 so that the articles cannot pass through the slot. Gate 33 is connected to the piston or rod of a fluid cylinder unit 33a and by operation of cylinder unit 33a, the gate can be moved between the closed and open positions. However, if a malfunction occurs in the conveying system, a signal will be transmitted to operate cylinder unit 33a and move the gate 33 to an open or non-obstructing position so that the articles being delivered to bin 12 will pass directly through slot 32 and will not be stacked.

Figure 4:
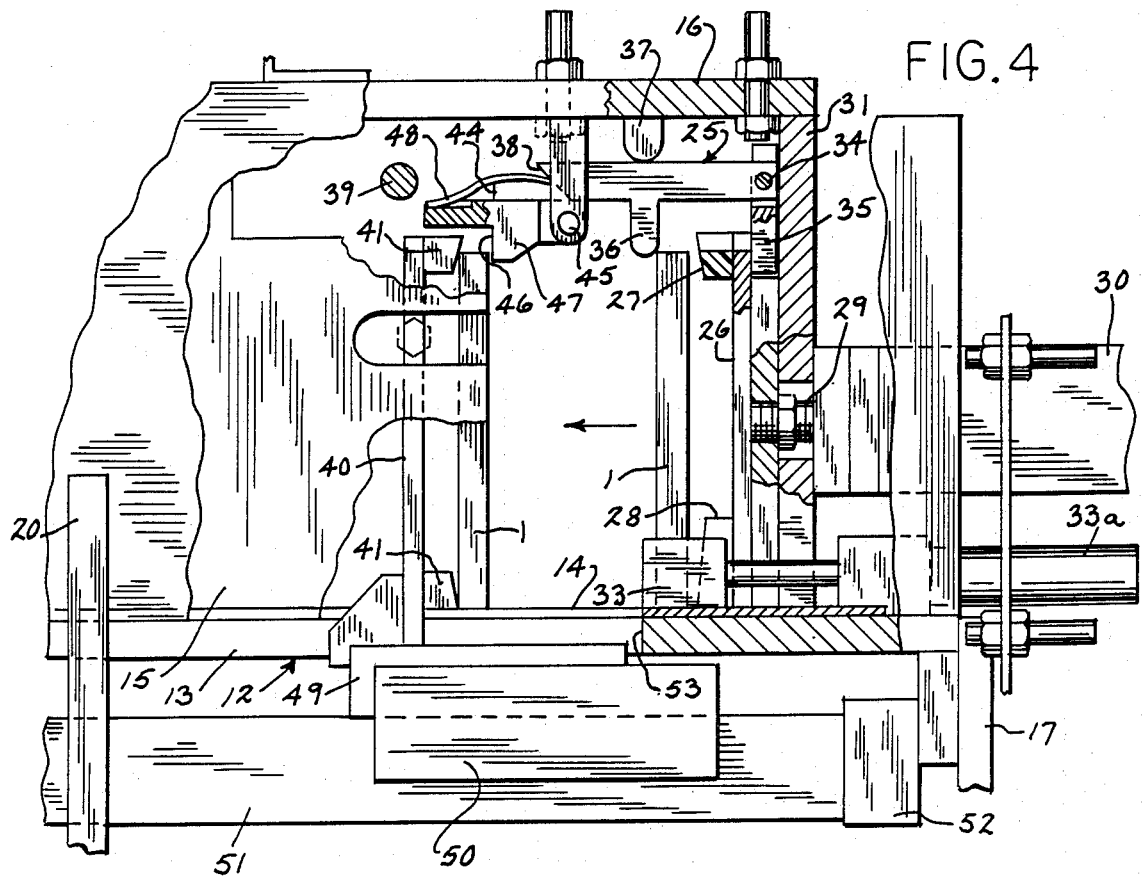
FIG. 4 is an enlarged fragmentary rear view with parts broken away and showing an article being received in the bin.

Holding member 25 is pivotally connected by pin 34 to a bracket 35 that extends upwardly from transfer plate 26. Holding member 25 is provided with a downwardly extending leg 36 which engages the upper edge of article 1 as the article is delivered to the bin, as shown in FIG. 4. Member 25 is held down in the holding position by engagement of the upper surface of the holding member with a fixed stop 37 which projects downwardly from top wall 16.

Figure 5:
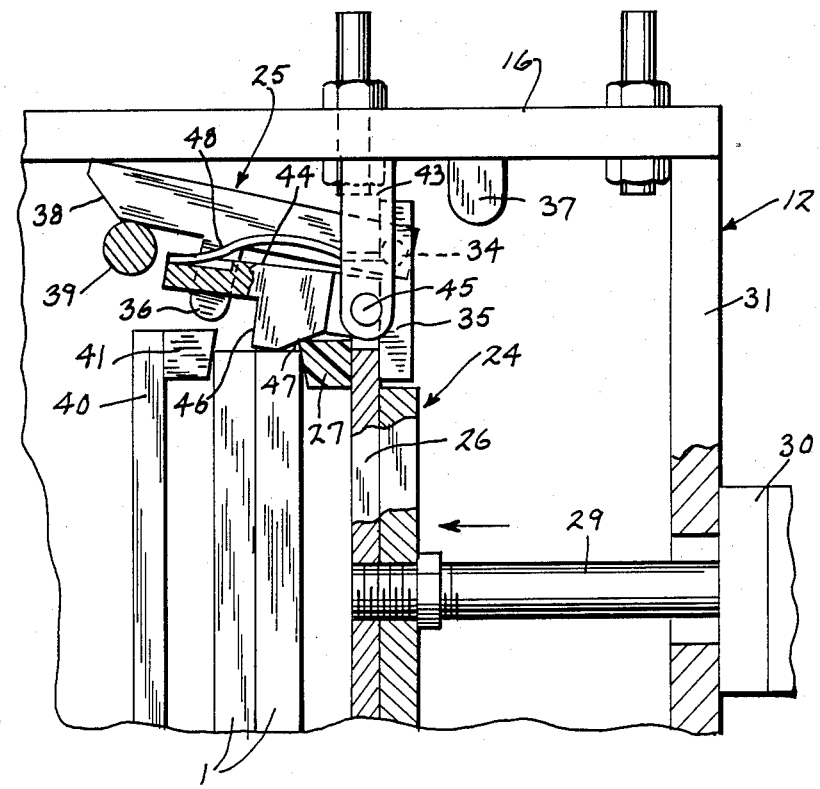
FIG. 5 is similar to FIG. 4 showing articles being stacked against the support plate.

After article 1 has been received in the space between transfer plate 26 and holding member 25 cylinder 30 is actuated to extend piston rod 29 and transfer the article laterally. Holding member 25 being attached to transfer plate 26, moves with the transfer plate and the outer end of member 25 is provided with an inclined cam surface 38 which engages a fixed roller 39 as the member 25 moves laterally. Engagement of cam surface 38 with roller 39 will cam holding member 25 upwardly to a release position to enable the article 1 to move laterally into bearing engagement with vertical plate 40 or with a previously stacked article 1, as shown in FIG. 5. The upper and lower edges of plate 40 are provided with nylon strips 41 which are engaged by the article 1. Strips 41, as well as strips 27 and 28, are provided with angular supporting surfaces so that contact with articles 1 will be an edge contact rather than a surface contact. This aids in preventing scratching or marring of plastic articles 1.

Roller 39 is mounted on the end of an arm 42 which is attached to the lower end of a bracket 43 that extends downwardly from top wall 16. With this connection, roller 39 is fixed in position relative to bin 12.

A pivotable latch 44 is employed to hold article 1 against plate 40. One end of latch 44 is pivoted by pin 45 to bracket 43 and the lower surface of latch 44 is provided with a shoulder 46 which engages the upper edge of article 1, as shown in FIG. 4.

Located between shoulder 46 and pivot 45 is an inclined cam surface 47 which is adapted to be engaged by the upper edge of the article as the article is being transferred laterally by transfer plate 26. Latch 44 is biased downwardly by a leaf spring 48 which connects the outer end of the latch with bracket 43. As article 1 is moved laterally the upper edge of the article will engage cam surface 47, pivoting latch 44 upwardly against the force of spring 48 to enable the article to pass beyond the shoulder 46. The spring will then urge the latch downwardly to move shoulder 46 into engagement with article 1 and hold the article in an upright position against the plate 40, or against a previously stacked article, as shown in FIG. 5.

Plate 40 is mounted for movement along the length of bin 12 and as each article 1 is transferred by transfer plate 26, plate 40 will move against the pressure of transfer plate 26. To provide this action, the lower end of plate 40 is provided with a bracket 49 which is attached to a carrier 50 of band cylinder 51. Carrier 50 is attached to a piston (not shown) which is slidable within cylinder 51 and a connector extends through a sealed slot in the cylinder to connect the piston to the carrier. End plates 52 support cylinder 51 from bottom plate 13 and bottom plate 13 is formed with a slot 53 which receives bracket 49, thereby permitting support plate 40 to move along the length of bin 12.

As articles 1 are being stacked against plate 40 there is no fluid pressure in cylinder 51 so that support plate 40 can move as the articles are stacked. However, the friction in the cylinder unit prevents free movement of the plate 40. After the stack 8 has been discharged from the stacking unit 7 cylinder 51 is actuated to return support plate 40 to its original condition, as shown in FIG. 4.

Mounted forwardly of rear wall 15 of bin 12 is a pusher plate 54 and the upper and lower edges of pusher plate 54 are provided with protective strips 55 formed of nylon or the like. Pusher plate 54 is adapted to move forwardly across the surface 13 of bin 12 to discharge the stack 8 onto conveyor 9. To provide this movement, a cylinder 56 is mounted through angle brackets to the upper surface of top wall 16 of bin 12. Cylinder 56 is a band cylinder, similar in construction to cylinder 51, and includes a carrier 57 which is attached to the piston and is movable along the length of the cylinder. Carrier 57 is connected through bracket 58 to pusher plate 54 and bracket 58 extends through an opening in plate 16. Thus, by operating cylinder 56, pusher plate 54 can be moved across bottom wall 13 to discharge the stack 8 of articles onto conveyor 9.

As shown in FIG. 1 a pair of spaced guides 59 are located along the side edges of conveyor 9 and serve to guide stack 8 in movement along the conveyor. Guides 59 are supported by an arch 60 that is connected to frame 10 and extends upwardly over the conveyor.

The apparatus provides a mechanism for automatically guiding and stacking articles in side-by-side relation and transferring the stack to a discharge site.

The apparatus can be used to stack a wide variety of different products and has particular use in stacking articles which are thin or vertically elongated and tend to tilt or fall when being conveyed.

In operation, articles 1 are normally conveyed in spaced relation on conveyor 3 and are supported between the parallel guide rails 6. As each article is discharged from the downstream end of conveyor 3, it slides along sloping bottom wall 13 of bin 12 and into engagement with the gate 33, which is mounted on rear wall 15. The article will be supported in an upright condition in bin 12 between transfer plate 26 and holding member 25.

Transfer cylinder 30 is then actuated to move the article laterally across bottom wall 13 of bin 12 and into engagement with support plate 40. As previously described, holding member 25 will be pivoted upwardly by engagement with the roller 39 as the holding member 25 is moved with the transfer plate 26 to release the article and enable the article to be held against plate 40 by latch 44.

With article 1 disposed in engagement with plate 40, transfer cylinder rod 29 is then retracted to move the transfer plate 26 back to its original position.

Each succeeding article is stacked in the same manner and support plate 40 moves along bottom plate 13 to accommodate the stacking.

When the desired number of articles have been stacked in bin 12, piston rod 21 of cylinder 22 is extended to tilt the bin, so that the bottom wall 13 is in a generally horizontal position. Cylinder 56 is then operated to cause pusher plate 54 to move forwardly to discharge the stack onto conveyor 9 where it can be transferred to other processing equipment. After discharge of the stack from bin 12, cylinder 56 is activated to return pusher plate 54 to its retracted position and the support plate 40 is returned to its original position by action of cylinder unit 51.

If for some reason, articles 1 are not spaced on the conveyor, but instead are in end-to-end relation, a stop 61, which is located at the downstream end of conveyor 3, is employed to sequentially feed the articles to bin 12. Stop 61 is supported from arch 6a by bracket 62. Stop 61 can be constructed in the manner as shown in U.S. Pat. No. 4,487,309 and is movable between an obstructing position, where it will be engaged by the leading edge of an article 1 to prevent movement of the article on the moving conveyor belt 5, to an nonobstructing position where the stop will not interfere with movement of the article on the belt 5. Stop 61 is actuated by a sensing system and acts to stop the end-to-end train of articles and sequentially release each article to bin 12.

Various modes of carrying out the invention are contemplated as being within the scope of the following claims particularly pointing out and distinctly claiming the subject matter which is regarded as the invention.

We claim:

1. An apparatus for stacking a plurality of articles in side-by-side relation, comprising first conveyor means for conveying articles in end-to-end relation, article receiving means disposed adjacent a downstream end of said first conveyor means for individually receiving each article from said first conveyor means, said receiving means including a bottom wall and a rear wall, said receiving means being movable between a receiving position where said bottom wall slopes downwardly and outwardly from the downstream end of said first conveyor means to a discharge position where said bottom wall is disposed substantially horizontal, stacking means disposed to move laterally of the direction of movement of said first conveyor means for stacking each article into contiguous side-by-side relation with adjacent articles on the downwardly sloping bottom wall of said receiving means to form a stack, said stacking means further including a support member against which said articles are stacked, and means for mounting the support member for movement in a direction transverse to the direction of movement of said article on said first conveyor means from a first position to a second position, said support member being moved from said first to said second position as said articles are stacked in said receiving means, means for moving said receiving means from the receiving position to the discharge position, and means for discharging the stack from said receiving means.

2. The apparatus of claim 1, and including holding means to hold each article upright as it is received in said receiving means and prevent tilting of said article prior to stacking, said holding means being constructed and arranged to be automatically released when said article is stacked by said stacking means.

3. The apparatus of claim 1 wherein said stacking means also includes a transfer member for transferring each article laterally in said receiving means and into bearing engagement with said support member.

4. The apparatus of claim 1 and including means for returning the support member to said first position.

5. The apparatus of claim 1 and including second conveyor means disposed parallel to said first conveyor means and disposed to receive the stack being discharged from said receiving means.

6. The apparatus of claim 5 wherein said second conveyor means is located at a level beneath said first conveyor means.

7. An apparatus for stacking a plurality of articles in side-to-side relation, comprising conveying means for conveying the articles in end-to-end relation, article receiving means disposed adjacent a downstream end of said conveying means for individually receiving each article as it is discharged from said conveying means, said receiving means including a bottom wall and a rear wall and said receiving means being movable between a receiving position where said bottom wall is disposed adjacent the downstream end of said conveying means to a discharge position where said bottom wall is disposed adjacent a discharge site, holding means connected to said receiving means for holding the article in an upright position on said receiving means, a support member extending upwardly from said bottom wall, transfer means for transferring each article being held by said holding means laterally against said support member, latch means for maintaining the article in an upright condition against said support member, means for mounting said support member for movement relative to said receiving means, successive articles being transferred by said transfer means against previously transferred articles to provide a side-by-side stack, means for moving said bottom wall from the receiving position to the discharge position, and means for discharging the stack from said receiving means to said discharge site.

8. The apparatus of claim 7 wherein said holding means is movable between an article holding position and a release position, and release means responsive to predetermined lateral movement of said transfer means for moving said holding means from the holding position to the release position to enable said article to be released from said holding means.

9. The apparatus of claim 8 wherein said latch means is movable between a latching position and an unlatching position, and means operable as a consequence of said holding means being moved to said release position for moving said latch means to the latching position to hold said article against said support member.

10. The apparatus of claim 7, and including spaced guide means disposed above said conveying means for guiding said articles in movement on said conveying means and retaining the articles in an upright condition.

11. The apparatus of claim 7, wherein said discharge site comprises second conveying means for receiving the stack discharged from said receiving means, said second conveying means disposed at a lower level than said first conveying means.

12. The apparatus of claim 7, wherein said rear wall is provided with an opening disposed in alignment with the path of travel of said articles being introduced to said receiving means, closure means for closing said opening, and means for moving said closure means between an open and closed position, said closure means when in the open position permitting said articles to freely pass through said receiving means so that the articles will not be stacked.

13. The apparatus of claim 12, wherein said opening in an elongated vertical slot, and said closure means comprises a plate to enclose said slot.

14. The apparatus of claim 9, wherein said holding means is provided with a downwardly extending abutment disposed to engage the upper edge of the article, and said release means is constructed and arranged to move said abutment upwardly out of engagement with said edge.

15. The apparatus of claim 14, and including a downwardly extending shoulder disposed on said latch means and positioned to engage an upper edge of said article to hold said article against said support member, said latch means also including biasing means for urging said latch means downwardly toward the upper edge of said article, and cam means disposed on the lower surface of said latch means and positioned to be engaged by the upper edge of the article as the article is transferred toward said support member to thereby cam said latch means upwardly to permit said article to pass beyond said shoulder, said biasing means urging said latch means downwardly to engage the shoulder with said upper edge of said article.

16. The apparatus of claim 1, wherein said rear wall is provided with an opening disposed in alignment with the path of travel of said articles being introduced to said receiving means from said first conveyor means, closure means for closing said opening, means for moving said closure means between an open and closed position, said closure means when in the open position permitting said articles to pass freely through said opening in said receiving means so that the articles will not be stacked in said receiving means.

17. The apparatus of claim 16, wherein said opening is an elongated vertical slot and said closure means comprises a plate to enclose said slot.

* * * * *